(12) United States Patent
Fong et al.

(10) Patent No.: US 11,115,075 B2
(45) Date of Patent: Sep. 7, 2021

(54) SAFE CASE WITH SECURITY CHOKE POINT CONTROL

(71) Applicant: PPIP LLC, Tempe, AZ (US)

(72) Inventors: Michael Fong, Chandler, AZ (US); Haydn Bennett Taylor, Detroit, MI (US); Teddy David Thomas, Bedford, NH (US)

(73) Assignee: PPIP LLC, Chandler, AZ (US)

( * ) Notice: Subject to any disclaimer, the term of this patent is extended or adjusted under 35 U.S.C. 154(b) by 0 days.

(21) Appl. No.: 16/526,394

(22) Filed: Jul. 30, 2019

(65) Prior Publication Data

US 2021/0036729 A1 Feb. 4, 2021

(51) Int. Cl.
*H04B 1/3888* (2015.01)
*H04M 1/02* (2006.01)
*A45C 11/00* (2006.01)

(52) U.S. Cl.
CPC ............ *H04B 1/3888* (2013.01); *A45C 11/00* (2013.01); *H04M 1/0279* (2013.01); *A45C 2011/002* (2013.01)

(58) Field of Classification Search
CPC .... H04B 1/3888; H04M 1/0279; A45C 11/00; A45C 2011/002
See application file for complete search history.

(56) References Cited

U.S. PATENT DOCUMENTS

| | | | | |
|---|---|---|---|---|
| 2014/0221057 | A1* | 8/2014 | Katis | H04B 1/3888 455/575.8 |
| 2015/0379982 | A1* | 12/2015 | Paquier | G10L 21/0216 704/260 |
| 2016/0299570 | A1* | 10/2016 | Davydov | G06F 3/167 |
| 2019/0306709 | A1* | 10/2019 | Kim | G06F 21/32 |

* cited by examiner

*Primary Examiner* — Minjung Kim
(74) *Attorney, Agent, or Firm* — Fernando & Partners, LLP

(57) ABSTRACT

In accordance with some embodiments, an apparatus that controls security choke points on a personal communication device is provided. The apparatus includes a housing arranged to hold a second device. The apparatus receives a first input and classifies the first input. The apparatus then determines which of a combination of one or more sensors on the second device that the first input is directed to based on an input type classification associated with the first input. The apparatus further disables a first combination of the one or more sensors on the second device in accordance with determining that the first input corresponds to a first input type classification.

20 Claims, 6 Drawing Sheets

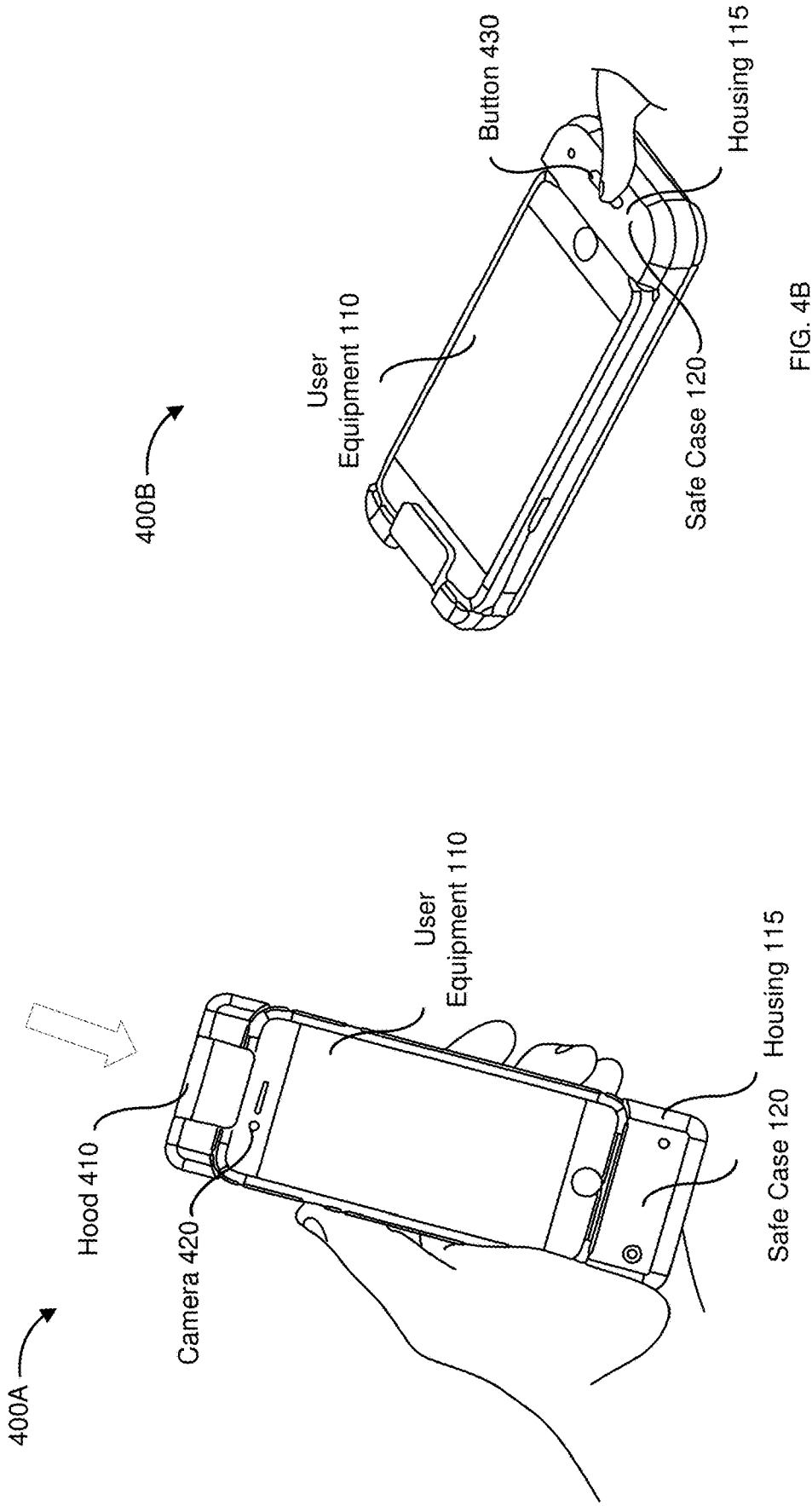

SAFE CASE WITH SECURITY CHOKE POINT CONTROL

TECHNICAL FIELD

This relates generally to the field of mobile device communication, and more specifically to an apparatus for controlling a security choke point on a personal communication device.

BACKGROUND

Personal communication devices (e.g., smart phones) have multiple sensors for collection information about a user and/or the environment. Currently, there is no intuitive and efficient way of selectively activating and/or de-activating the private data collection and possible transmission by these sensors. A user typically provides multiple inputs and goes through multiple screens on a smartphone in order to activate or de-activate one sensor setting. For example, in order to turn off one sensor, a user often provides one input to display the settings screen, possibly scrolls up/down to locate the affordance corresponding to the sensor, provides another input to display the sensor setting screen, and then toggles to enable/disable the sensor. The process would be repeated in order to activate or de-activate each sensor. Such lengthy and cumbersome processes create a security choke point.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

FIGS. 4A and 4B illustrate an exemplary security choke point control via different inputs in accordance with some embodiments;

Figure 1:
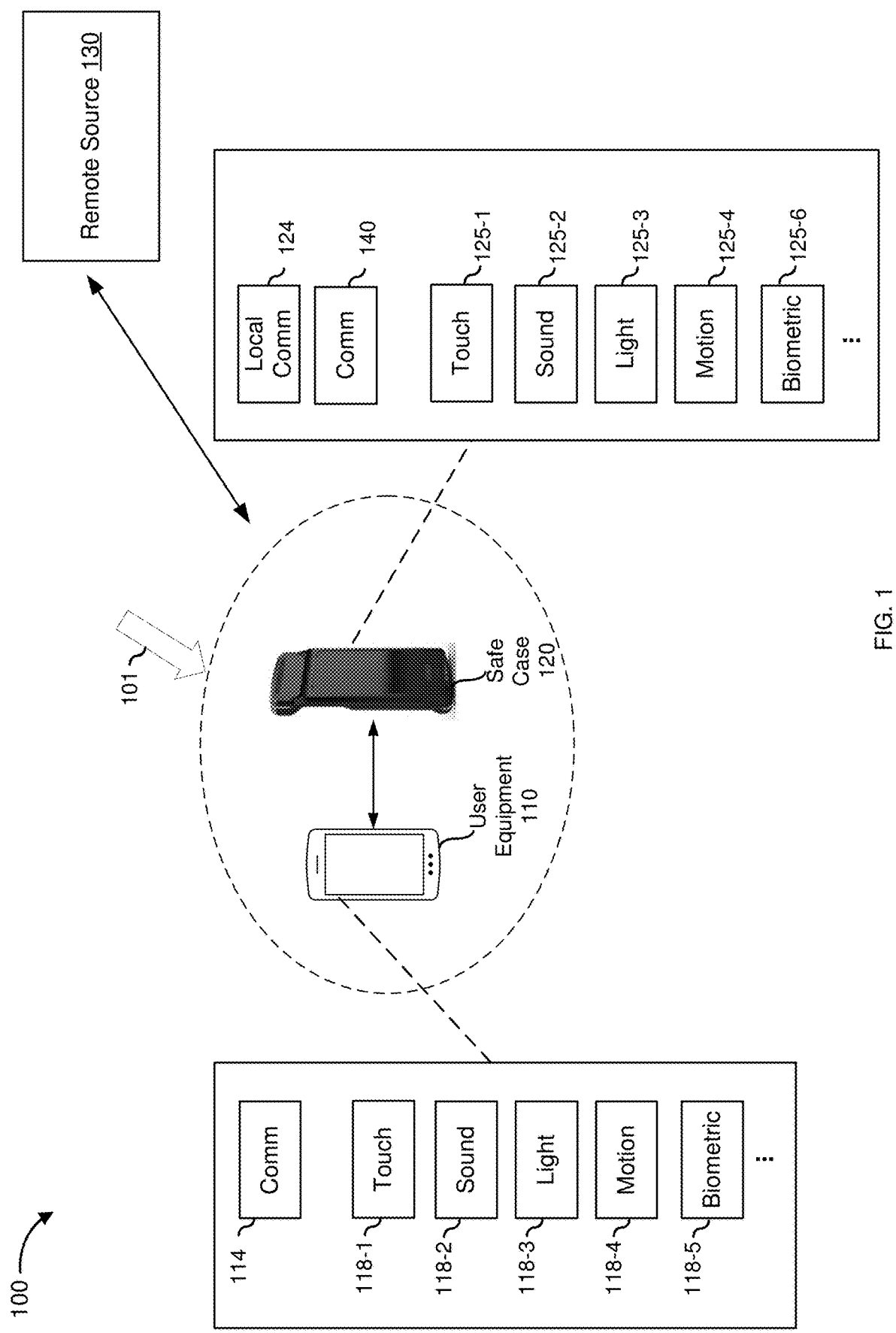
FIG. 1 is a block diagram of an exemplary operating environment that controls security choke point in accordance with some embodiments.

In accordance with common practice the various features illustrated in the drawings cannot be drawn to scale. Accordingly, the dimensions of the various features can be arbitrarily expanded or reduced for clarity. In addition, some of the drawings cannot depict all of the components of a given system, method or device. Finally, like reference numerals can be used to denote like features throughout the specification and figures.

DETAILED DESCRIPTION

In accordance with various embodiments, a safe case disclosed herein addresses the aforementioned security choke point issue. The safe case holds the personal communication device and acts as an extension of the personal communication device in order to control one or more security choke points on the personal communication device. In particular, the safe case can selectively activate and/or de-activate one or more sensors on the personal communication device at once. For example, by moving a hood of the safe case, pressing a button or a slider on the safe case, providing an input to an integrated biometric sensor (e.g., a fingerprint enabled button, a facial recognition camera, a voice recognition unit), and/or tapping on a contact point of a touch-sensitive surface, the collection and possibly exchange of private information utilizing the one or more sensors can be quickly stopped. Accordingly, the safe case disclosed herein effectively and efficiently guards user privacy.

In accordance with some embodiments, a method is performed at a first apparatus that includes a housing arranged to hold a second device. The method includes receiving, by the first apparatus, a first input and classifying the first input; determining which of a combination of one or more sensors on the second device that the first input is directed to based on an input type classification associated with the first input; and disabling a first combination of the one or more sensors on the second device in accordance with determining that the first input corresponds to a first input type classification.

In accordance with some embodiments, a device includes one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of a device, cause the device to perform or cause performance of the operations of any of the methods described herein. In accordance with some embodiments, a device includes means for performing or causing performance of the operations of any of the methods described herein.

In accordance with some embodiments, a device includes one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of a device, cause the device to perform or cause performance of the operations of any of the methods described herein. In accordance with some embodiments, a device includes means for performing or causing performance of the operations of any of the methods described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

It should be appreciated that in the development of any actual embodiment (as in any development project), numerous decisions must be made to achieve the developers' specific goals (e.g., compliance with system and business-related constraints), and that these goals will vary from one embodiment to another. It will also be appreciated that such development efforts might be complex and time consuming, but would nevertheless be a routine undertaking for those of ordinary skill in the art of image capture having the benefit of this disclosure.

Referring to FIG. 1, an exemplary operating environment 100 in which a safe case 120 (also known as an active base, a smart case, or an active case) controls one or more security choke points on a user equipment 110 (also referred to as a personal communication device), in accordance with some embodiments. As will be explained below with reference to FIG. 2, the safe case 120 includes a housing arranged to hold the user equipment 110. Further, the safe case 120 includes various types of sensors 125, e.g., a touch sensor 125-1, a sound or acoustic sensor 125-2, a light sensor 125-3, a motion sensor 125-4, a biometric sensor 125-5, etc. Additionally, the safe case 120 includes one or more local communication devices 124 for pairing with one or more communication devices 114 on the user equipment 110. In addition to the one or more local communication devices 124, the safe case 120 also includes communication devices 140 in order to communicate with other electronic device(s), e.g., a remote source 130.

In some embodiments, the user equipment 110 held by the safe case 120 includes a processor, the one or more communication devices 114, an input/output interface, various types of sensors 118 (e.g., one or more touch sensors 118-1, sound or acoustic sensors 118-2, light sensors 118-3, motion sensors 118-4, biometric sensors 118-5, etc.) and memory for storing applications and instructions associated with the applications. In some embodiments, the user equipment 110 is a portable communications device, such as a mobile phone, a wearable device, a tablet, a laptop computer, a digital media player, an electronic reader, or the like. In some embodiments, the user equipment 110 is a non-portable device, such as a desktop computer, a data storage device, a smart TV, a video game console, a smart home appliance or the like that is capable of storing, transmitting, and receiving data.

The sensors 118 on the user equipment 110 and the sensors 125 on the safe case 120 can collect sensor data associated with a user of the user equipment 110, e.g., heart and/or pulse patterns, gait, fingerprints, voice, odor/scent, facial image of the user, among others. If unprotected, a malicious third party can obtain the sensor data, e.g., requesting and obtaining the sensor data via the communication devices 114, and derive private information from the sensor data. In order to protect user privacy, the safe case 120 can disable various sensors 118 on the user equipment 110 at once in response to an input 101. In some embodiments, the sensors 125 on the safe case 120 can independently collect sensor data and communicate securely, e.g., via the communication devices 140 of the safe case 120 to a secure server for authentication purpose.

Figure 2:
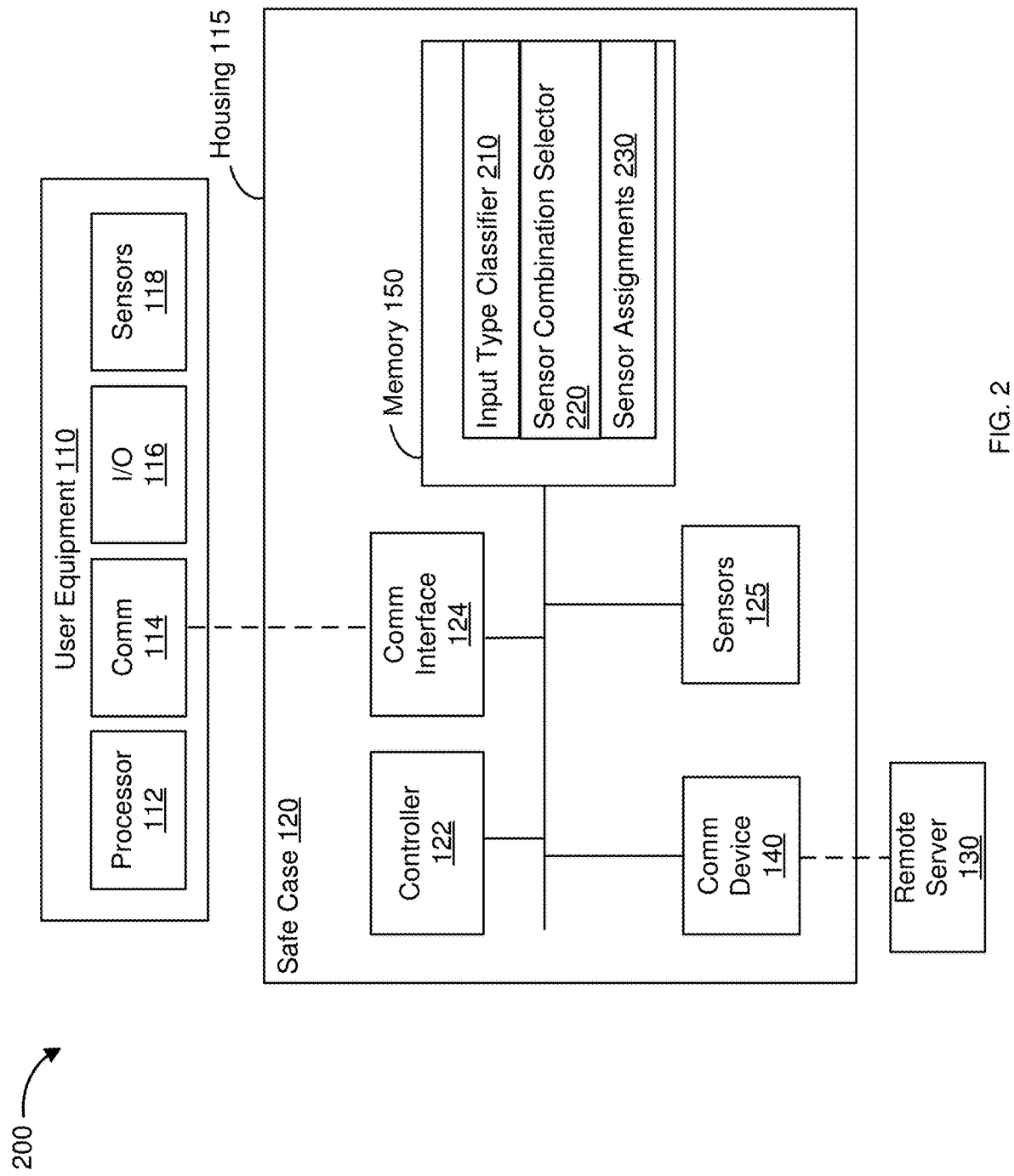
FIG. 2 is a block diagram illustrating exemplary devices and components in the security choke point environment in accordance with some embodiments.

FIG. 2 is a simplified block diagram 200 illustrating the user equipment 110, the safe case 120, and the remote source 130 in the exemplary platform 100, in accordance with some embodiments. In some embodiments, the safe case 120 includes a housing 115 arranged to hold the user equipment 110. Though not shown in FIG. 2, in some embodiments, the housing 115 includes a plurality of components mateable with one another. In other words, the plurality of components of the housing 115, once mated with one another, form an assembly to receive and hold the user equipment 110. The assembly allows a user to insert the user equipment 110 into the safe case 120 or take the user equipment 110 out of the safe case 120. Different from a conventional base or case that merely holds a user equipment, the safe case 120 actively monitors activities on the user equipment 110 and selectively disables or enables one or more sensors 125 on the user equipment 110.

In some embodiments, the user equipment 110 held by the safe case 120 includes a processor 112, one or more communication devices 114, input/output devices 116, one or more sensors 118, and memory for storing data as well as instructions executed by the processor 112. In some embodiments, the input/output devices 116 include a display (including a touch screen display), a touch-sensitive surface, a keyboard (virtual or physical), a mouse, a pen, microphones, cameras, and/or speakers. In some embodiments, the one or more communication devices 114 connect the user equipment 110 and an external electronic device wirelessly (e.g., using wireless modem) or through a wired connection. In some embodiments, the external electronic device is the safe case 120, such that the one or more communication devices 114 connect to the safe case 120 wirelessly or through a wired communication. The wireless communication includes at least one of, for example, Wi-Fi (e.g., IEEE 802.11a, IEEE 802.11b, IEEE 802.11g, IEEE 802.11n, and/or IEEE 802.11ac), Bluetooth (BT), Bluetooth Low Energy (BLE), Near Field Communication (NFC), Global Positioning System (GPS), and/or cellular communication, including but not limited to Long-Term Evolution (LTE), Wideband Code Division Multiple Access (W-CDMA), code division multiple access (CDMA), time division multiple access (TDMA), or Global System for Mobile Communications (GSM). The wired connections include at least one of, for example, a Universal Serial Bus (USB) connector, a High Definition Multimedia Interface (HDMI) connector, and/or a Lightning® (a registered trademark of Apple Inc. of Cupertino, Calif.) connector.

In some embodiments, the user equipment 110 includes one or more sensors 118, such as one or more biometric sensors 118-5 (FIG. 1), motion sensors 125-4 (FIG. 1), accelerometers, gyroscopes, and/or magnetometers (e.g., as part of an inertial measurement unit (IMU)) for obtaining information concerning the position (e.g., altitude) of the user equipment 110. In some embodiments, the sensors 118 are coupled to the input/output devices 116, e.g., the touch sensors 118-1 (FIG. 1) and/or force sensors coupled to a touch sensitive surface, sound or acoustic sensors 118-2 (FIG. 1) coupled to a microphone, or light sensors 118-3 (FIG. 1) coupled to a camera. In some embodiments, the one or more sensors 118 are coupled to the one or more communication devices 114, so that the sensor data collected by the sensors 118 can be transmitted to another device (e.g., to the safe case 120 via a communication interface 124).

In some embodiments, the safe case 120 holding the user equipment 110 also includes sensors 125 that can independently obtain sensor data. In some embodiments, the sensors 125 include one or more accelerometers, gyroscopes, magnetometers (e.g., as part of an inertial measurement unit (IMU)), Global Positioning Systems (GPS), compasses, barometers, photometers and thermometers, touch sensors 125-1 (FIG. 1), force sensors, vibration sensors, motion sensors 125-4 (FIG. 1), light sensors 125-3 (FIG. 1), sound or acoustic sensors 125-2 (FIG. 1) in microphones for recording voice, electrocardiogram sensors, hydration sensors, and/or the like.

In some embodiments, the sensor data collected by the sensors 125 and/or 118 are communicated through a communication device 140 and/or a communication interface 124 of the safe case 120. In some embodiments, the communications through the communication device 140 and/or the communication interface 124 are encrypted to form secure channels. In some embodiments, the communication device 140, which is at least partially supported by the housing 115, connects the safe case 120 to another electronic device, e.g., a different case 120, a different user equipment 110, or the remote server 130 wirelessly or through a wired connection. In some embodiments, the communication interface 124, which is also at least supported by the housing 115, is connectable to the user equipment 110 held by the safe case 120, e.g., by connecting to the one or more communication devices 114 of the user equipment 110. The communication through the communication interface 124 can be wireless or wired.

The wireless connections include, for example, Wi-Fi (e.g., IEEE 802.11a, IEEE 802.11b, IEEE 802.11g, IEEE 802.11n, and/or IEEE 802.11ac), Bluetooth (BT), Bluetooth Low Energy (BLE), Near Field Communication (NFC), Global Positioning System (GPS), and/or cellular communication, including but not limited to Long-Term Evolution (LTE), Wideband Code Division Multiple Access (W-CDMA), code division multiple access (CDMA), time division multiple access (TDMA), or Global System for Mobile Communications (GSM). The wired connections include for example, a Universal Serial Bus (USB) connector, a High Definition Multimedia Interface (HDMI) connector, a Lightning® (a registered trademark of Apple Inc. of Cupertino, Calif.) connector, and/or contact pins or pads.

In some embodiments, the safe case 120 includes circuitry (e.g., a bus) that interconnects components of the safe case 120, including the communication interface 124, the communication device 140, and the sensors 125. In some embodiments, the safe case 120 further includes a controller 122 that controls various components of the safe case 120. In some embodiments, the controller 122 is on a single chip or chipset. The controller 122 can be embodied in a variety of forms, e.g., as various hardware-based processing means, as instructions stored in memory 150 and executed by a processor, or as a combination of hardware, firmware, and software.

In some embodiments, the safe case 120 includes memory 150, which further includes high-speed random-access memory, such as DRAM, SRAM, DDR RAM, or other random access solid state memory devices, and non-volatile memory, such as one or more magnetic disk storage devices, optical disk storage devices, flash memory devices, or other non-volatile solid-state storage devices. In some embodiments, the memory 150, including the non-volatile and volatile memory device(s) within the memory 150, comprises a non-transitory computer readable storage medium. In some embodiments, the memory 150 or the non-transitory computer readable storage medium of the memory 150 stores the following programs and data structures, or a subset thereof, including an input type classifier 210 for receiving an input and classifying the input detected by the sensors 125 and/or 118 into various types, a sensor combination selector 220 for determining and/or selecting a combination of sensors associated with an input type to be disabled and/or enabled, and sensor assignment 230 for storing the association of the input type with sensor combinations.

Figure 3:
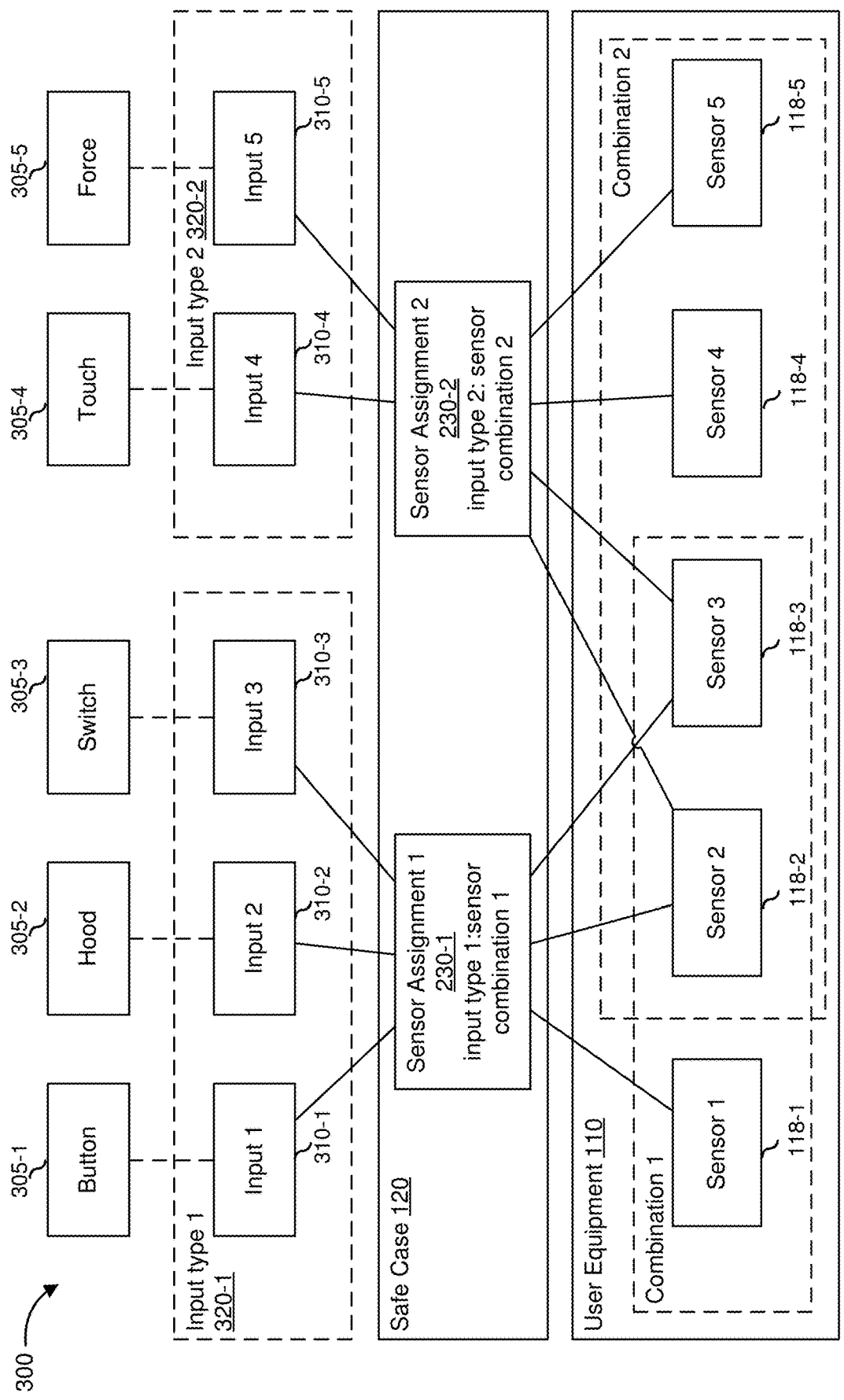
FIG. 3 is a block diagram illustrating input type classification and sensor combination assignments in accordance with some embodiments.

FIG. 3 illustrates an exemplary environment 300 for security choke point control of the user equipment 110, in accordance with some embodiments. In some embodiments, the one or more sensors 125 (FIG. 2) on the safe case 120 and/or the one or more sensors 118 (FIG. 2) on the user equipment 110 can detect one or more inputs, e.g., input 1 310-1, input 2 310-2, input 3 310-3, input 4 310-4, input 5 310-5, etc. In some embodiments, the safe case 120 (e.g., the input type classifier 210, FIG. 2) receives data associated with the one or more inputs 310 and divides the one or more inputs 310 into an input type classification, e.g., based on types of sensors associated with detecting the inputs 310.

For instance, the safe case 120 receives input 1 310-1 detected by sensors coupled with a button 305-1, input 2 310-2 detected by sensors coupled with a hood assembly 305-2 (e.g., part of the housing 115 of the safe case 120, FIG. 2), input 3 310-3 detected by sensors coupled with a switch 305-3, input 4 310-4 detected by touch sensors 305-4, and/or input 5 310-5 detected by force sensors 305-5. Because pressing the button 305-1, moving the hood assembly 305-2, and toggling the switch 305 involve moving a mechanical part, the safe case 120 classifies input 1 310-1, input 2 310-2, and input 3 310-3 as input type 1 320-1. Because both the touch sensors 305-4 and the force sensors 305-5 are related to touch-sensitive devices, the safe case 120 classifies input 4 310-4 and input 5 310-5 as input type 2 320-2. As such, the input type classification in the exemplary environment 300 includes as least two input types, i.e., a first input type corresponding to moving a mechanical part and a second input type corresponding to interacting with a touch-sensitive device.

Further, the safe case 120 assigns combinations of the sensors 118 on the user equipment 110 to the input type classification. For example, the safe case 120 assigns sensor 1 118-1, sensor 2 118-2, and sensor 3 118-3 on the user equipment 110 to input type 1 320-1, and assigns sensor 2 118-2, sensor 3 118-3, sensor 4 118-4, and sensor 5 118-5 to input type 2 320-2. In some embodiments, the safe case 120 stores the sensor assignments 230. For instance, in FIG. 3, the association of sensor 1 118-1, sensor 2 118-2, and sensor 3 118-3 with input 1 310-1, input 2 310-2, and input 3 310-3 is stored as entry sensor assignment 1 230-1; and the association of sensor 2 118-2, sensor 3 118-3, sensor 4 118-4, and sensor 5 118-5 with input 4 310-4 and input 5 310-4 is stored as entry sensor assignment 2 230-2.

Using the security choke point control methods and apparatus disclosed herein has several benefits. As explained above, using conventional systems and methods, a user often enters multiple inputs in order to disable one sensor. Further, the inputs involved are often at precise locations or have precise patterns and/or sequences in order to reach a specific setting for disabling a sensor, e.g., tapping on an affordance at a location of a touch screen to display the settings screen and toggling another affordance displayed at a specific location to change the settings, etc. In contrast, the sensor assignments disclosed herein allow inputs of different types to achieve the same goal of disabling the same combination of sensors at once. For example, anyone of input 1 310-1, input 2 310-2, or input 3 310-3 can disable the combination of sensor 1 118-1, sensor 2 118-2, and sensor 3 118-3; and any one of input 4 310-4 or input 5 310-5 can disable the combination of sensor 2 118-2, sensor 3 118-3, sensor 4 118-4, and sensor 5 118-5. As such, by eliminating intervening user inputs, allowing coarse input type classification, and associating combinations of sensors to the input type classification, the safe case 120 efficiently controls sensors 118 and removes security choke points on the user equipment 110.

FIGS. 4A and 4B are schematic diagrams 400A and 400B illustrating two different inputs disabling the same combination of sensors on the user equipment 110, in accordance with some embodiments. As explained above, the safe case 120 includes the housing 115 that receives and holds the user equipment 110. In some embodiments, the housing 115 is a housing assembly that further includes sub-assemblies, e.g., a plurality of both moveable parts and non-moveable parts that can form an enclosure when assembled together. For example, the sub-assemblies can include a base and a hood assembly 410 that is moveable. In some embodiments, when the hood assembly 410 is pushed down or lowered (as shown by the arrow in FIG. 4A), the safe case 120 can disable a plurality of sensors on the user equipment 110 at once.

For instance, when the hood assembly 410 is lowered, the hood assembly 410 blocks a camera 420. As a result, the camera 420 cannot record images and the light sensors coupled with the camera 420 are effectively disabled. In another example, when the hood assembly 410 is pushed down, the bottom of the user equipment 110 is pushed against a portion of the housing 115. In some embodiments, the contact between the housing 115 and the user equipment 110 at least partially weakens the microphones at the bottom of the user equipment 110 from recording user voice and/or ambient sound that reveals the user's identity, private conversations, or whereabouts. As such, the acoustic sensors coupled with microphones on the user equipment 110 are effectively disabled, by coupling a seal to openings of the microphones and/or by actively feeding masking sound to the microphones on the user equipment 110. In another example, when the hood assembly 410 is pushed down, the safe case 120 can generate jamming signals to effectively disable the capability of RF sensors on the user equipment 110.

In FIG. 4B, the housing 115 of the safe case 120 at least partially supports a button 430. When the button 430 is pressed, the safe case 120 can disable a plurality of sensors on the user equipment 110 at once. For example, in response to the button press, the safe case 120 can initiate masking sound generation to effectively disable the microphones on the user equipment 110 from recording user voice and/or ambient sound that reveal user's identity, private conversation, or whereabouts. Further, in response to the button press, the safe case 120 can control light sensors coupled to a camera by controlling light sensor path. The light sensor path control can include, but not limited to, directing the light sensor data to the safe case 120 for removal of biometric markers from the light sensor data or erasing the light sensor data altogether. In another example, in response to the button press, the safe case 120 can generate electronic signals in order to effectively disable the capability of RF sensors on the user equipment 110.

In some embodiments, when the safe case 120 (e.g., the input type classifier 210, FIG. 2) receives the input such as the hood assembly movement shown in FIG. 4A or the button press shown in FIG. 4B, the safe case 120 classifies the input, e.g., classifying both inputs as the same input type of moving a mechanical part. As such, the same combination of sensors is disabled in response to either the hood assembly movement or the button press. In some embodiments, the safe case 120 (e.g., the sensor combination selector 220, FIG. 2) can search the stored sensor assignments 230 (FIG. 2). Based on the sensor assignment 230, the safe case 120 disables multiple sensors at once, e.g., disabling at least the light sensors, acoustic sensors, and RF sensors at once.

Figure 5:
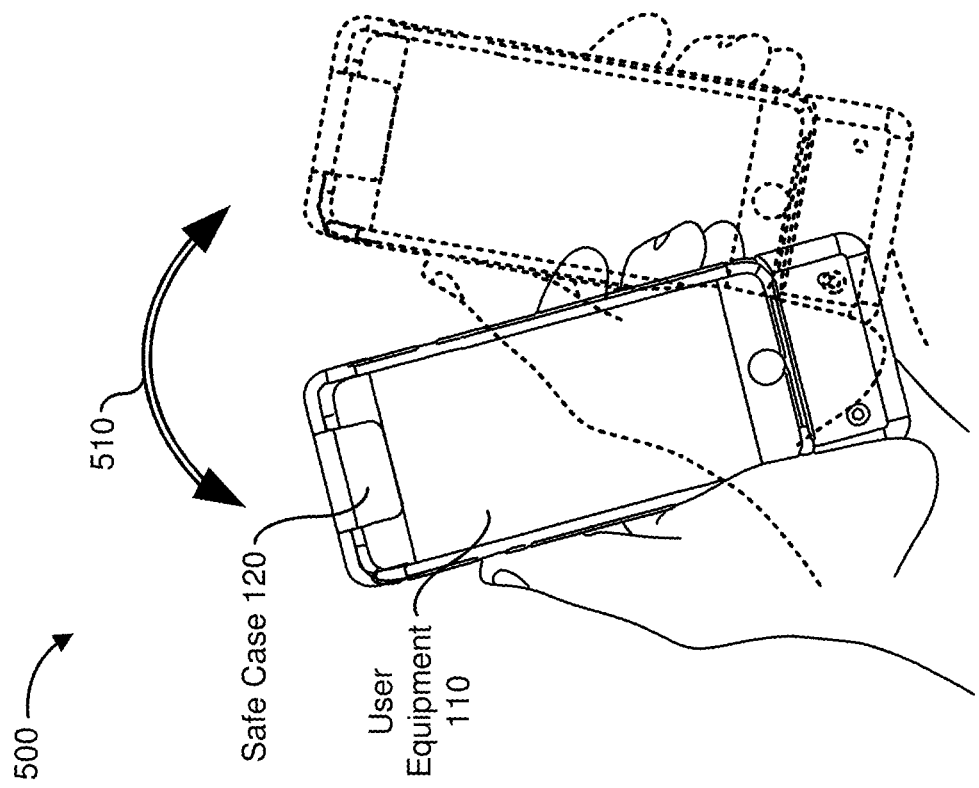
FIG. 5 illustrates another exemplary security choke point control in response to movements in accordance with some embodiments.

FIG. 5 is a schematic diagram 500 illustrating a movement 510 disabling a combination of sensors on the user equipment 110, in accordance with some embodiments. In some embodiments, the safe case 120 classifies movements of the safe case 120 as a different input type from moving a mechanical part input type as shown in FIGS. 4A and 4B. As a result, a different combination of sensors can be disabled in response to the movement 510. For example, the movement 510 can be in any direction, such as side-to-side, up/down, front/back, etc. In response to the movement 510, the safe case 120 disables a combination of motion sensors on the user equipment 110, including but not limited to proximity sensor, accelerometer, magnetometer, gyroscopic sensor, barometer, etc. In some embodiments, when disabling the combination of sensors, other sensors on the user equipment 110 that are not part of the combination still operate. For example, the touch sensors and/or fingerprint sensors on the user equipment 110 can still operate, so that the user equipment 110 can still detect touch inputs and/or obtain fingerprints of the user.

Figure 6A:
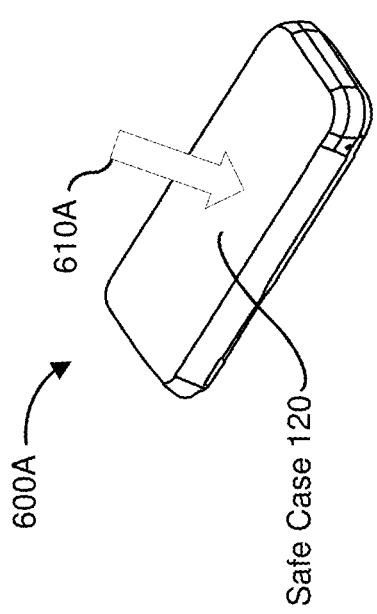
FIGS. 6A and 6B illustrate yet another exemplary security choke point control via different inputs in accordance with some embodiments.
Figure 6B:
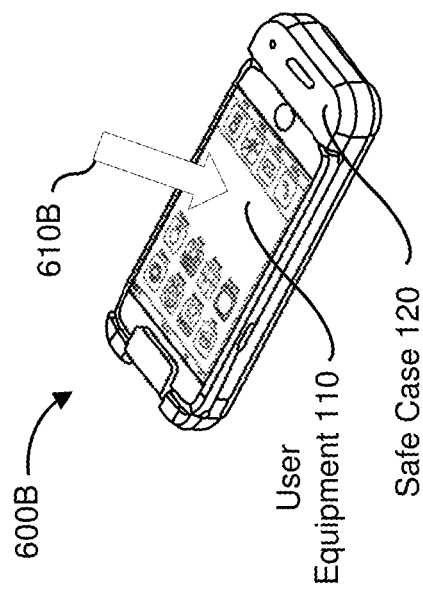

FIGS. 6A and 6B are schematic diagrams 600A and 600B illustrating disabling a combination of sensors in response to different inputs 610A and 610B, in accordance with some embodiments. In FIGS. 6A and 6B, the inputs 610A and 610B can be tactile inputs (e.g., tapping, pressing, or knocking, etc.). In FIG. 6A, the input 610A is on the back of the safe case 120 and obtained by sensors (e.g., the touch sensors 125-1) on the safe case 120. In FIG. 6B, the input 610B is on a touch screen of the user equipment 110 and obtained by sensors (e.g., the touch sensor 118-1) on the user equipment 110. In the embodiments that the sensors on the user equipment 110 detects the tactile input 610B as shown in FIG. 6B, the controller 122 (FIG. 2) of the safe case 120 obtains or receives data associated with the tactile input 610B through coupling of the communication interface 124 (FIG. 2) with the communication devices 114 (FIG. 2).

Upon receiving the data representing the input 610A or 610B, the safe case 120 analyzes the input 610 in order to determine if the input 610A or 610B is directed to a combination of sensors on the user equipment 110 based on the input type classification explained above. For example, based on a location (on the back of the safe case 120), timing, force, speed, and/or acceleration of the input 610A and the type of the input 610A being a touch input detected by a touch sensor on the safe case 120, the input 610A is classified as an input type being associated with disabling all sensors on the user equipment 110, e.g., signaling a distress mode. Likewise, based on a location (on a portion of the touch-sensitive surface of the user equipment where no affordance is displayed), timing, force, speed, and/or acceleration of the input 610B and the type of the input 610B being a touch input detected by a touch sensor on the user equipment 110, the input 610B is classified as an input type being associated with disabling all sensors on the user equipment 110, e.g., signaling a distress mode. As such, in response to either the input 610A or 610B, the safe case 120 disables all sensors on the user equipment 110, e.g., turning off all sensors and/or controlling sensor as well as communication paths associated with the sensors to stop potential transmission of the sensor data to a remote source.

Figure 7:
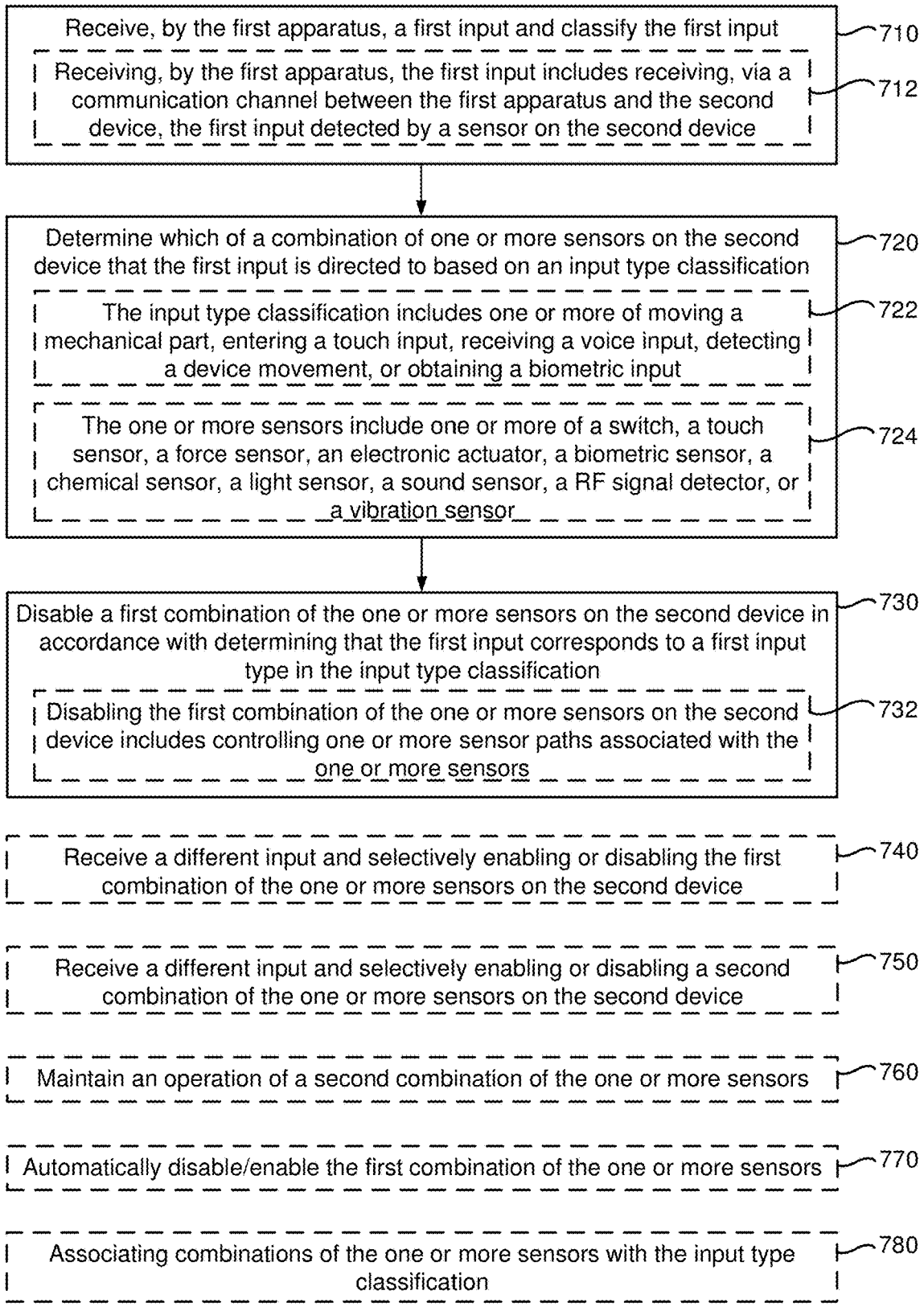
FIG. 7 is a flowchart illustrating a method of security choke point control in accordance with some embodiments.

FIG. 7 is a flowchart representation of a security choke point control method 700, in accordance with some embodiments. In some embodiments, the security choke point control method 700 is performed at a first apparatus (e.g., the safe case 120, FIG. 1) with a housing (e.g., the housing 115, FIG. 2) arranged to hold a second device (e.g., the user equipment 110, FIG. 1). In some embodiments, the first apparatus also includes a controller (e.g., the controller 122, FIG. 2) for controlling sensor paths and communication paths and a non-transitory memory storing instructions for execution by the controller. Briefly, the method 700 includes receiving, by the first apparatus, a first input and classifying the first input; determining which of a combination of one or more sensors on the second device that the first input is directed to based on an input type classification associated with the first input; and disabling a first combination of the one or more sensors on the second device in accordance with determining that the first input corresponds to a first input type classification.

To that end, as represented by block 710, the method 700 includes receiving, by the first apparatus, a first input and classifying the first input. For example, in FIG. 4A, the safe case 120 detects lowering the hood assembly 410 as the first input; in FIG. 4B, the safe case 120 detects pressing the button 430 as the first input; in FIG. 5, the safe case 120 detects movements 510 as the first input; and in FIGS. 6A and 6B, the safe case 120 detects the tactile input 610A or 610B as the first input. In some embodiments, as represented by block 712, receiving, by the first apparatus, the first input includes receiving, via a communication channel between the first apparatus and the second device, the first input detected by a sensor on the second device. For example, in FIG. 6B, the first input 610B can be detected by sensors on the user equipment 110. The safe case 120 then receives the first input 610B via the coupling of the communication interface 124 (FIG. 2) with the communication devices 114 (FIG. 2) of the user equipment 110.

The method 700 continues, as represented by block 720, with the first apparatus determining which of a combination of one or more sensors on the second device that the first input is directed to based on an input type classification. In some embodiments, as represented by block 722, the input type classification includes one or more of moving a mechanical part (e.g., FIGS. 4A and 4B), entering a touch input (e.g., FIGS. 6A and 6B), receiving a voice input (e.g., a voice command), detecting a device movement (e.g., FIG. 5), or obtaining a biometric input (e.g., obtaining a specific fingerprint, facial pattern, or iris scan). In some embodiments, as represented by block 724, the one or more sensors include one or more of a switch, a touch sensor, a force sensor, an electronic actuator, a biometric sensor, a chemical sensor, a light sensor, a sound sensor, a RF signal detector, or a vibration sensor.

The method 700 further includes, as represented by block 730, disabling a first combination of the one or more sensors on the second device in accordance with determining that the first input corresponds to a first input type in the input type classification. For example, as shown in FIG. 3, input 1 310-1, input 2 310-2, and input 3 310-3 are classified as input type 1; and input 4 310-4 and input 5 310-5 are classified as input type 2. Further, based on the sensor assignments 230, the safe case 120 determines that input type 1 is directed to sensor combination 1, which includes sensor 1 118-1, sensor 2 118-2, and sensor 3 118-3; and the safe case 120 also determines that input type 2 is directed to sensor combination 2, which includes sensor 2 118-2, sensor 3 118-3, sensor 4 118-4, and sensor 5 118-5. Accordingly, in response to receiving any one of input 1 310-1, input 2 310-2, or input 3 310-3, the combination of sensor 1 118-1, sensor 2 118-2, and sensor 3 118-3 is disabled; and in response to receiving any one of input 4 310-4 or input 5 310-5, the combination of sensor 2 118-2, sensor 3 118-3, sensor 4 118-4, and sensor 5 118-5 is disabled.

In some embodiments, as represented by block 732, disabling the first combination of the one or more sensors on the second device includes controlling one or more sensor paths associated with the one or more sensors. For example, the controller 122 (FIG. 2) of the safe case can direct turning off the user equipment 110, which can result in disabling all sensors 118 on the user equipment 110. In some embodiments, instead of turning off a sensor 118 on the user equipment 110, through coupling with the input device comprising the sensors, e.g., coupling a seal to the opening of a microphone, and/or providing masking signals to the sensors, e.g., feeding masking sound to the microphone, the controller 122 manages the sensor paths for obtaining the sensor data. As such, even though the sensors 118 on the user equipment 110 can still collect the sensor data, the sensor data do not reveal private information.

In some embodiments, as represented by block 740, the method 700 further includes receiving, by the first apparatus, a second input that is different from the first input, determining that the second input is directed to the first combination of the one or more sensors based on the input type classification, and selectively enabling or disabling the first combination of the one or more sensors on the second device. For example, as shown in FIG. 3, input 4 310-4 is different from input 5 310-5. Since both input 4 310-4 and input 5 310-5 are classified as input type 2, according to the sensor assignment 230, both input 4 310-4 and input 5 310-5 are directed to sensor combination 2, which includes sensor 2 118-2, sensor 3 118-3, sensor 4 118-4, and sensor 5 118-5 is disabled. As a result, in response to receiving any one of input 4 310-4 or input 5 310-5, the combination of sensor 2 118-2, sensor 3 118-3, sensor 4 118-4, and sensor 5 118-5 is disabled. In another example, as shown in FIGS. 4A and 4B, in response to either lowering the hood assembly 410 or pressing the button 430, the same combination of sensors is disabled.

In some embodiments, as represented by block 750, the method 700 further includes receiving, by the first apparatus, a second input, and disabling a second combination of the one or more sensors in accordance with determining that the second input is associated with a second input type different from the first input type, wherein the second combination is at least partially different from the first combination. For example, in FIG. 3, input 4 310-4 is different from input 1 310-1. In response to receiving input 4 310-4, sensor combination 2 is disabled. Sensor combination 1 includes sensor 2 118-2, sensor 3 118-3, sensor 4 118-4, and sensor 5 118-5 is at least partially different from sensor combination 1, which includes sensor 1 118-1, sensor 2 118-2, and sensor 3 118-3.

In some embodiments, as represented by block 760, the method 700 further includes maintaining an operation of a second combination of the one or more sensors, different from the first combination of the one or more sensors. For example, as explained above with reference to FIG. 5, while movements related sensors are disabled, other types of sensors on the user equipment 110, e.g., acoustic sensors, can still operate and collect sensor data.

In some embodiments, as represented by block 770, the method 700 further includes determining whether or not the activities meet a criterion associated with the first combination of the one or more sensors, and selectively disabling or enabling the first combination of the one or more sensors on the second device in accordance with a determination that the criterion has been met. In other words, the safe case 120 continuously or periodically monitors activities on the user equipment 110. When the safe case 120 determines that the one or more sensors are collecting/disseminating private information, the safe case 120 can disable one or more sensors on the user equipment 110 automatically, e.g., without any user input. For example, geofencing can be established so that when the user carrying the safe case 120 enters a high crime region, a combination of sensors is disabled, e.g., disabling microphones and/or not allowing the user equipment 110 to transmit RF signals. When the user exits the high crime region, the safe case 120 can direct the user equipment 110 to turn these sensors back on without user inputs.

In some embodiments, as represented by block 780, the method 700 further includes associating combinations of the one or more sensors with the input type classification. In other words, the association of the input types in the input type classification with the sensor combination is configurable. For example, as shown in FIG. 3, one can classify pressing a button 305-1 as input type 1 and moving the hood 305-2 also as input type 1. Further, input type 1 can be assigned to correspond to sensor combination 1. However, one can also classify pressing the button 305-1 to a different input type and assigns the different input type to a different sensor combination.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
   at a first apparatus including a housing, a controller, a non-transitory memory, and one or more communication devices at least partially supported by the housing, wherein the housing is arranged to hold a second device that is distinct from the first apparatus:
   receiving, by the first apparatus, a first input, wherein the first input is detected by a second sensor on the second device and a second input is detected by a first sensor on the first apparatus;
   classifying the first input as a first input type based on an input type classification, wherein a respective input type in the input type classification corresponds to a plurality of inputs, and the second input also corresponds to the first input type, wherein the first input type comprises inputs associated with moving a mechanical part;
   determining which of a combination of one or more sensors on the second device that the first input is directed to based on the input type classification and sensor assignments, wherein the sensor assignments specify each corresponding input type for a set of sensors on the second device; and
   directing the second device to selectively enable or disable a first combination of the one or more sensors on the second device without intervening user inputs in accordance with determining that the first input corresponds to the first input type and the first input type corresponds to the first combination of the one or more sensors on the second device in the sensor assignments.

2. The method of claim 1, wherein receiving, by the first apparatus, the first input includes receiving, via a communication channel between the first apparatus and the second device, the first input detected by the second sensor on the second device.

3. The method of claim 1, wherein the input type classification includes one or more of moving a mechanical part, entering a touch input, receiving a voice input, detecting a device movement, or obtaining a biometric input.

4. The method of claim 1, wherein the one or more sensors include one or more of a switch, a touch sensor, a force sensor, an electronic actuator, a biometric sensor, a chemical sensor, a light sensor, a sound sensor, a radio frequency signal detector, or a vibration sensor.

5. The method of claim 1, wherein directing the second device to selectively enable or disable the first combination of the one or more sensors on the second device includes controlling one or more sensor paths associated with the one or more sensors.

6. The method of claim 1, further comprising:
   determining that the second input is directed to the first combination of the one or more sensors based on the input type classification and the sensor assignments; and
   directing the second device to selectively enable or disable the first combination of the one or more sensors on the second device.

7. The method of claim 1, further comprising:
   receiving, by the first apparatus, a third input, different from the first input and the second input; and directing the second device to selectively enable or disable a second combination of the one or more sensors in accordance with determining that the third input is associated with a second input type different from the first input type, wherein the second combination of sensors is at least partially different from the first combination of sensors.

8. The method of claim 1, further comprising:

maintaining an operation of a second combination of the one or more sensors, different from the first combination of the one or more sensors.

9. The method of claim 1, further comprising:

determining whether or not activities of the second device meet a criterion associated with the first combination of the one or more sensors; and directing the second device to selectively disable or enable the first combination of the one or more sensors on the second device in accordance with a determination that the criterion has been met.

10. The method of claim 1, further comprising:

associating combinations of the one or more sensors with the input type classification; and storing associations of the combinations of the one or more sensors with the input type classification as the sensor assignments in the non-transitory memory.

11. An apparatus comprising:

a housing arranged to hold a second device, distinct from the apparatus;

a non-transitory memory;

one or more communication devices at least partially supported by the housing;

an input type classifier, stored in the non-transitory memory, operable to receive a first input, wherein the first input is detected by a second sensor on the second device and a second input is detected by a first sensor on the first apparatus, and classify the first input as a first input type based on an input type classification, wherein a respective input type in the input type classification corresponds to a plurality of inputs, and the second input also corresponds to the first input type, wherein the first input type comprises inputs associated with moving a mechanical part;

a sensor combination selector, coupled to the input type classifier, operable to determine which of a combination of one or more sensors on the second device that the first input is directed to based on the input type classification and sensor assignments, wherein the sensor assignments specify each corresponding input type for a set of sensors on the second device; and a controller, coupled to the sensor combination selector and the input type classifier, operable to direct the second device to selectively enable or disable a first combination of the one or more sensors on the second device without intervening user inputs in accordance with the sensor combination selector determining that the first input to the first input type and the first input type corresponds to the first combination of the one or more sensors on the second device in the sensor assignments.

12. The apparatus of claim 11, wherein receiving the first input includes receiving, via a communication channel between the apparatus and the second device, the first input detected by the second sensor on the second device.

13. The apparatus of claim 11, wherein the input type classification includes one or more of moving a mechanical part, entering a touch input, receiving a voice input, detecting a device movement, or obtaining a biometric input.

14. The apparatus of claim 11, wherein the one or more sensors include one or more of a switch, a touch sensor, a force sensor, an electronic actuator, a biometric sensor, a chemical sensor, a light sensor, a sound sensor, a radio frequency signal detector, or a vibration sensor.

15. The apparatus of claim 11, wherein directing the second device to selectively enable or disable the first combination of the one or more sensors on the second device includes controlling one or more sensor paths associated with the one or more sensors.

16. The apparatus of claim 11, wherein:

the sensor combination selector is further operable to determine that the second input is directed to the first combination of the one or more sensors based on the input type classification and the sensor assignments; and the controller is further operable to direct the second device to selective enable or disable the first combination of the one or more sensors on the second device.

17. The apparatus of claim 11, wherein:

the input type classifier is further operable to receive a third input, different from the first input and the second input; and the controller is further operable to direct the second device to selectively enable or disable a second combination of the one or more sensors in accordance with determining that the third input is associated with a second input type different from the first input type, wherein the second combination of sensors is at least partially different from the first combination of sensors.

18. The apparatus of claim 11, wherein the controller is further operable to:

maintain an operation of a second combination of the one or more sensors, different from the first combination of the one or more sensors.

19. The apparatus of claim 11, wherein the controller is further operable to:

determine whether or not activities of the second device meet a criterion associated with the first combination of the one or more sensors; and direct the second device to selectively disable or enabling the first combination of the one or more sensors on the second device in accordance with a determination that the criterion has been met.

20. The apparatus of claim 11, wherein the input type classifier is further operable to:

associate combinations of the one or more sensors with the input type classification; and store associations of the combinations of the one or more sensors with the input type classification as the sensor assignments in the non-transitory memory.

* * * * *